United States Patent Office 3,770,671
Patented Nov. 6, 1973

3,770,671
POLYURETHANES PRODUCED OXYALKYLATED RESOLES
James L. McFarling, Granville, Ohio, assignor to Owens-Corning Fiberglas Corporation
No Drawing. Filed Aug. 14, 1972, Ser. No. 280,688
Int. Cl. C08g 22/14, 22/44
U.S. Cl. 260—2.5 AP          4 Claims

ABSTRACT OF THE DISCLOSURE

This disclosure concerns polyurethanes formed by the reaction of oxyalkylated, resole-based polyols and polyisocyanates. The resoles used have a structure comprising, by weight, 40 to 70% monomeric trimethylol phenol and dimeric resoles; 15 to 30% dimethylol phenol and trimeric resole polymers; 5 to 10% monomethylol phenol, tetrameric and larger resole polymers and 1% or less phenol.

BACKGROUND OF THE INVENTION

This invention relates to polyurethanes and polyurethane foams. More particularly, the invention pertains to polyurethane foams wherein a resole-based polyol of a particular structure imparts commercially acceptable properties to the foam.

Over a period of years various polyurethane compositions have evolved as items of particular commercial value. These polyurethane compositions, especially in the form of rigid foams, have many desirable properties which can be incorporated into a variety of useful products. Polyurethane foams having a substantially closed cell structure find use as insulating materials. Possessing a high degree of structural strength, polyurethanes, cellular and non-cellular, have use as structural products and materials in the building industry and recently, in the furniture industry. These polyurethanes can be reinforced with various materials, for example, glass fibers to produce products of even greater strength.

It is known that polyurethanes, especially rigid polyurethane foams, can be formed by reacting polyisocyanates and polyols (compounds having two or more reactive OH groups) usually in the presence of a blowing agent and catalyst. In order to impart rigid characteristics to rigid polyurethane foams a low to medium molecular weight polyol of high functionality is used. Use of this type of polyol structure results in a high degree of crosslinking as the foam is formed. The end product is a rigid foam. Conversely, using a polyol having high molecular weight and low functionality results in a low degree of crosslinking and a flexible foam. Thus the ultimate properties of a polyurethane foam product can be tailored by selecting a proper polyol structure.

Use of resole-based polyols in the production of rigid polyurethane foams is known in the art. However, use of resoles in the production of rigid polyurethane foams generally is considered impractical. One reason for their disfavor as polyol precursors is the fact that resoles are considered to be unstable materials. Unless properly handled the sensitive resole continues to react at temperatures greater than ambient temperature thereby producing a gel and perhaps a solid. Storage of resoles therefore involves a certain degree of risk.

Polyurethane foams produced from resoles also have been characterized as having poor humidity aging and dimensional stability.

Significant cost advantages can be gained however if resole-based polyols are used because of the relative low cost and ready availability of the two most commonly used resole components, phenol and formaldehyde.

SUMMARY OF THE INVENTION

It has been discovered that commercially acceptable, stable polyols can be made from oxyalkylated resoles where the resoles have a particular molecular structure distribution. These resole-based polyols comprise, by weight, 40 to 70% trimethylol phenol and dimeric resoles; 15 to 30% dimethylol phenol and trimeric resole polymers; 5 to 10% monomethylol phenol and tetrameric and larger resole polymers; and 1% or less free phenol.

DESCRIPTION OF THE INVENTION

This invention is particularly concerned with resole-based polyols. The resoles used are formed by the aqueous condensation reaction of an excess of formaldehyde with phenol in the presence of a basic catalyst. The reaction is a complex equilibrium which results in a mixture of monomeric and polymeric methylol phenols.

To convert a resole to a polyol it is reacted with an alkylene oxide such as propylene oxide in the presence of a basic catalyst. This step is frequently called oxyalkylation. It forms reactive —OH sites on the resole which will be reactive with the —NCO groups of polyisocyanates.

It has been found that in some cases the basic catalyst used in the oxyalkylation reaction may be the same as the catalyst as was used in the phenolic resole producing reaction.

The resole structure embodying the principles of this invention has a preponderance of components with relatively low molecular weight and high functionality, that is four or more reactive hydrogen atoms per molecule. After oxyalkylating this resole structure a polyol is produced which upon reaction with a polyisocyanate will undergo a high degree of crosslinking and form a polyurethane structure characterized by the following structure:

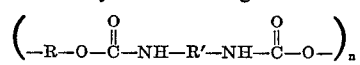

Polyurethane foams made from these polyols will be rigid and have good dimensional stability.

It has been discovered that resoles having a particular structural distribution (as determined by gas and liquid chromatography) will, when reacted with an alkylene oxide, form polyols which can be used to produce commercially acceptable polyurethanes and polyurethane foams.

The resole structural distribution found to be effective for use as polyol precursors is: 40 to 70% trimethylol phenol and dimeric resole; 15 to 30% dimethylol phenol and trimeric resole polymers; 5 to 10% monomethylol phenol, tetrameric and larger resole polymers; and 1% or less phenol.

Trimethylol phenol may be shown as:

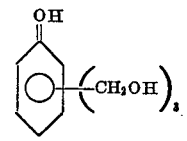

Dimeric resole may be depicted:

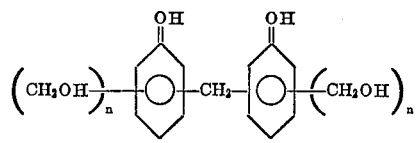

where $n=2$.

Trimethylol phenol and dimeric resole are the most desirable resole structures. They have an excellent combination of molecular weight (160 to 300) with a high degree of functionality.

Dimethylol phenol and trimeric resole polymers when present in the range of 15 to 30% by weight do not adversely affect polyurethane properties.

Monomethylol phenol and the tetrameric and larger resole polymers should be kept at a minimum, generally not more than 10% by weight. In larger amounts they result in soft foams being formed (because of their low functionality) or hard to handle polyols because of their high molecular weight.

Phenol is a "chain stopper" which stops crosslinking and inhibits polymer formation. It should be kept at or below 1% by weight.

A resole having too large a fraction of low functionality molecular units i.e. two or less reactive sites per molecular unit is undesirable because a polyol made by oxypropylation of such a resole will also possess low functionality. Polyols of low functionality produce polyurethane foams which will not possess the required proper rigidity or dimensional stability. However a polyol with a sufficient number of reactive sites (three or more) and having a suitable molecular weight will form a three dimensional network resulting in a stable, rigid polyurethane foam. The resole-based polyols of this invention have three or more reactive sites.

One way to obtain an increased number of functional groups is to synthesize large resole molecules. But larger resole molecules will be of high molecular weight and resoles of high (more than 500) molecular weight are undesirable because their high molecular weight results in increased polyol viscosity. This makes the polyols difficult to work with in commercial quantities in commercial foaming equipment.

Formaldehyde and phenol have been found ideal for use in producing the resoles of this invention. It is possible however that other aldehydes could be used in the resole synthesis. These might include acetaldehyde, propionaldehyde and the like. Other hydroxybenzene compounds which might be substituted for phenol include orthocresol, paracresol, 3,5 dimethylphenol, paraethylphenol, orthopropylphenol and the like. Substitution of other aldehydes for formaldehyde or other hydroxybenzene compounds for phenol is not recommended, however, since it could change or modify the preferred resole structural distribution.

The basic catalysts found useful in the resole synthesis include tertiary amines, such as trimethylamine and triethylamine; inorganic bases, such as sodium hydroxide, potassium hydroxide, barium hydroxide; quaternary ammonium compounds, such as benzyltrimethylammoium hydroxide, hydroxyethyltrimethylammonium hydroxide; and metal organic alcoholates such as sodium methoxide. The tertiary amine catalysts are especially suitable because they are effective as catalysts in the later oxyalkylation of the resole and in the reaction of the resole-based polyol with an isocyanate to form polyurethane foam. Thus they can be used in excess and remain in the resole reaction product and polyol.

A resole synthesis reaction used to produce resoles of the desired structural distribution has been carried out at a temperature between 140° F. and 180° F. under a nitrogen atmosphere. The preferred formaldehyde to phenol mole ratio is between 2.4 to 1 to 2.8 to 1. The catalyst concentration is between 0.03 and 0.20 mole catalyst per mole phenol. After the phenol and formaldehyde have been reacted to a point where free phenol content is 1% or less, the reaction products are water stripped at a temperature between 120° F. and 125° F. under a vacuum between 26 and 30 inches of mercury. The reaction products have at this stage a residual viscosity of 30,000 to 60,000 centipoises.

The resole-based polyols of this invention are prepared by oxyalkylation of the resoles. This is generally accomplished by reacting the resoles with a 1,2-alkylene oxide, such as propylene oxide, in the presence of a basic catalyst. Both inorganic and organic catalysts can be used but inorganic catalysts do not work as well with stripped resole because they are generally less soluble in the resole. When tertiary amine catalyst are used for resole synthesis enough catalyst is left in the stripped resole to catalyze the oxyalkylation reaction.

Oxyalkylation of the resole differs from standard polyol oxyalkylation because of the temperature sensitivity of the resole. When resolves are oxyalkylated a temperature of 140° F. to 160° F. is used for the alkylene oxide addition and the pressure is kept below 20 p.s.i.g. so that a large excess of unreacted oxide will not build up. After the desired amount of alkylene oxide has been added, the reaction temperature may be raised to about 275° F. to complete the reaction. Finally the completed oxyalkylated resole or polyol is vacuum stripped at a temperature of about 300° F. and a vacuum of at least 26 inches of mercury to remove undesirable water and unreacted alkylene oxide.

Propylene oxide is especially suitable for use in oxyalkylating the stripped resole. Other alkylene oxides that may be used include ethylene oxide, butylene and the like.

The total amount of propylene oxide is dependent upon the initial formaldehyde to phenol ratio, content of the resole cook solution (which is dependent upon time, temperature and catalyst) and the phenol viscosity desired.

The viscosity of the polyol is directly related to the propylene oxide to phenol mole ratio. In the case of the resole-based polyols of this invention, a wide range of viscosity values can be obtained, depending upon the use for which the polyol is to be put.

Rigid, low density polyurethane foams can be prepared by reacting the resole-based polyols of this invention with organic polyisocyanates in the presence of a suitable catalyst, a blowing agent, and generally a surfactant. The polyols of this invention work well for both the one-short technique and the pre-polymer approach.

The amount of polyisocyanate used will vary slightly but in general the total —NCO equivalent to total polyol active hydrogen equivalent should be greater than one.

Suitable isocyanates or reactive —NCO containing compounds which may be developed in practicing the invention include:

2,4-tolylene diisocyante;
2,6-tolylene diisocyanate;
p-phenylene diisocyanate;
polymethylene polyphenylisocyanate;
diphenyl-methane diisocyanate;
m-phenylene diisocyanate;
hexamethylene diisocyanate;
butylene-1,4-diisocyanate;
octamethylene diisocyanate;
3,3'-dimethoxy 4,4-biphenylene diisocyanate;
1,18-octadecamethylene diisocyanate;
polymethylene diisocyanate;
benzene triisocyanate;
naphthylene-2,4-diisocyanate,
3,3'-dimethyl-4,4'-biphenylene diisocyanate;
4,4'-diisocyanate;
diphenyl ether;
naphthylene-1,5-diisocyanate;
diisocyanate-dicyclohexyl-methane;
p-xylylene diisocyanate;
xylylene diisocyanate;
hydrogenated diphenylene diisocyanate;
hydrogenated diphenyl methane diisocyanate;
toluene-2,4,6-triisocyanate;
3-methyl-4,6,4'-triisocyanate diphenylmethane;
2,4,4'-triisocyanate diphenylmethane;
2,4,4'-triisocyanate diphenyl;
2,4,4'-triisocyanate diphenyl ether;
long chain hydrocarbons and substituted hydrocarbons terminated with —NCO radicals and mixtures thereof.

Prepolymers having reactive isocyanate or —NCO groups may also be used.

The foaming operation is effected by means of incorporating a blowing agent in the foam forming constituents. It can be water or a low boiling, high molecular weight gas, which vaporizes below the temperature of the foaming mass. The preferred blowing agents are certain halogen-substituted aliphatic hydrocarbons. In rigid foams intended for use as insulation the incorporation of a gas lowers the foams heat conductivity and results in obtaining a better K-factor. All of these methods are known in the art.

Preferred blowing agents are fluorocarbons such as trichloromonofluoromethane, dichlorofluoromethane and the like. The weight of blowing agents used is varied depending on the foam density desired.

Catalysts are commonly used to increase the rate of the isocyanate-polyol reaction. A wide variety of compounds can be used. Tertiary amines are commonly used for this purpose. When they are used in the polyol producing reactions (resole formation and oxyalkylation) it has been discovered that any residual amounts left with the polyol may be used in polyurethane forming reaction. Trimethylamine and triethylamine are preferably used in practicing this invention because of their low cost.

When producing urethane foams it is useful in many cases to use a surfactant which serves to regulate rigid foam cell size. The surfactants most frequently used are high molecular weight, liquid silicones. The weight of surfactant used is generally between 0.5% and 1.5% by weight of the polyol.

In addition to reacting the resole-based polyols of this invention with polyisocyanates they may be blended with other commercially available polyols. These might include sucrose-based polyols, sorbitol-based polyols, novolaks, and the like. By using polyol blends it is possible to build in desired foam properties. The excellent solvent characteristics of the resole-based polyols of this invention makes blending easy.

The resole-based polyols of this invention may be adapted for use in making polyurethanes for various applications including pour-in-place, buns, spray foam, furniture foam and moldings.

The invention will be more readily understood by reference to the following Examples 1 to 10 which are intended to be illustrative only rather than limiting the scope of the invention to the specific details set forth therein.

Various commercially available products are used in the following examples. These products are identified by trade name and chemical description in the following glossary;

"F11B" is trichlorofluoromethane, a blowing agent.

"Dabco R-8020" is 80% dimethylethanolamine and 20% triethylenediamine; it is used as a catalyst in the formation of foamed polyurethanes.

"T-12" is a catalyst, dibutyltin dilaurate, used in the formation of foamed urethanes.

"L-520" is polysiloxane-polyoxyalkylene, a surfactant.

"DC-193" is dimethyl-silicone-polyethylene glycol, a copolymer used as a surfactant.

"Mobay MRS" and "Mobay MR" are both polyphenyl polymethylene polyisocyanates having 31.5% to 32% available isocyanate with a hydroxyl equivalent of 420.

"PAPI" is polyphenyl polymethylene isocyanate.

"R-350X" is a polyol, an alkylene oxide adduct of the Mannich reaction product of a phenolic compound with formaldehyde and an alkanolamine having an OH number of 530.

"Fyrol 6," a flame retardant polyol, is

Example 1

A solution of 360 pounds of 52% formaldehyde and 216.7 pounds of phenol was charged to a stainless steel reaction vessel. The mole ratio of formaldehyde to phenol was 2.7:1. The mole catalyst to mole phenol ratio used was 0.111:1. The 26.04 pounds of triethylamine catalyst was added to the reaction vessel over a period of two hours. The reaction was carried out at a temperature between 140° F. and 145° F. for a total reaction time of 9.5 hours. The resole produced by the reaction was water stripped at a temperature between 115° F. and 125° F. under a vacuum of 26.5 inches mercury for 2.5 hours leaving a residual water content of 4%.

Example 2

240 pounds of the water stripped resole of Example 1 reacted (oxyalkylated) with 300 pounds of propylene oxide to form a resole-based polyol. Sufficient catalyst remained in the stripped resole (from the resole forming reaction) to promote the oxyalkylation reaction. The reaction temperature was maintained between 140° F. and 150° F. for a total of 16 hours while propylene oxide was added. The final amount of reacted propylene oxide corresponded to a mole ratio of propylene oxide to phenol of 5.2 to 1. After the reaction was completed the resole-based polyol was water stripped at a temperature between 270° F. and 280° F. for 4 hours under a vacuum between 26 and 27 inches of mercury. The water stripped polyol had a water content of 0.05%, a hydroxyl number of 390, and a Brookfield viscosity of 14,000 centipoises at 25° C.

Example 3

42 grams of the resole-based polyols of Example 2, 0.42 gram of "L-520" surfactant, 12.60 grams of "F11B" blowing agent, and 0.63 gram of triethylamine catalyst were mixed together. This mixture was vigorously stirred with 44.30 grams of polymeric isocyanate ("Mobay MRS") by means of a high speed air stirrer. The resulting prefoam was poured into a small "shoe box." The rigid polyurethane foam bun produced was found to have a density of 2.03 lbs./ft.$^3$ and 9.0% open cells. Compressive strength of the foamed products was 37.8 lbs./in.$^2$ parallel and 16.6 lbs. in.$^2$ perpendicular to the rise of the foam. These properties indicate the foam would be acceptable for most commercial applications.

Example 4

The polyol component for a polyurethane spray foam system was made by mixing 1725 grams of the resole-based polyol of Example 2 with 625 grams of "R-350X" polyol, 187 grams of ethylene glycol, 208 grams of "Fyrol 6," 2.8 grams of "DC-193," 0.7 gram of "R-8020," 1 gram of "T-12" and 1215 grams of "F11B." This mixture was charged to one side of a Gusmer Model FF spray foam machine. The isocyanate side of the Gusmer unit was charged with "Mobay MR" isocyanate. The spray foam product produced had 3.3% open cells and a density of 2.2 lbs./ft.$^3$. It had a heat distortion temperature of 140° C. and a compressive strength of 25 pounds per square inch. The spray foam product had a volume change of 11% after 28 days of humidity aging at 158° F. and 95% relative humidity.

Example 5

The structure of a resole reaction product formed by using techniques like those of Example 1 was analyzed using gas chromatography, liquid chromatography, and mass spectroscopy techniques. This analysis showed the Example 1 reaction product to comprise, by weight:

Phenol, 1.0%

Monomethylol phenol, (ortho- and para-methylol phenol), 5.8%

Dimethylolphenol, (ortho, ortho- and ortho, para-methylolphenol), 10.6%

Trimethylol phenol, 22.7%
Dimeric resole, 31.7%
Trimeric resole, 16.8%
Tetrameric and higher resole polymers, 4.0%

The instruments used to obtain these readings and those in Example 6 were: liquid chromatograph, Model ALC201 commercially available from Waters Associates; gas chromatograph, Perkin-Elmer's Model 900; mass spectroscopy, Hitachi Perkin Elmer's Model RMU6.

The above described resole was oxypropylated with propylene oxide using a procedure like that in Example 2 to produce a resole-based polyol, 200 grams of the resole-based polyol, 2 grams of "L–520" surfactant, 67 grams of "F11B" blowing agent, and 3 grams of "R–8020" catalyst were mixed together and then reacted with 200 grams of polyisocyanate ("Mobay MRS") to form rigid polyurethane foam buns. These foam buns had the following properties:

Density—1.95 lbs./ft.$^3$
Open cells—5.2%
Humidity aging, volume change—15.6% after 7 days at 158° F. and 95% relative humidity
Heat distortion temperature—98° C.

Example 6

A resole not falling within the scope of this invention was determined by gas chromatography, liquid chromatography, and mass spectroscopy to have the following structural distribution:

Phenol, 1.6%
Monomethylolphenol, (ortho-methylolphenol and para-methylolphenol), 7.9%
Dimethylolphenol, (ortho, ortho-methylolphenol and ortho, para-methylolphenol), 14.6%
Trimethylolphenol, 22.7%
Dimeric resole, 25.2%
Trimeric resole, 10.8%
Tetrameric and higher resole polymers, 0.9%

The above described resole was oxypropylated using techniques like those illustrated in Example 2 to produce a resole-based polyol. This was done by mixing together 200 grams of the resole with 2 grams of "L–520" surfactant, 67 grams of "F11B" blowing agent, and 3 grams of "R–8020" catalyst. This mixture was then reacted with 200 grams of polyisocyanate ("Mobay MRS") to form rigid polyurethane buns. The foam buns had the following properties:

Density—1.99 lbs./ft.$^3$
Open cells—5.7%
Humidity aging, volume change—46.1% after 7 days at 158° F. and 95% relative humidity
Heat distortion temperature—87° C.

Example 7

A rigid polyurethane foam product was prepared as described in Example 5 except 2.5 grams (instead of 3 grams) of "R–8020" catalyst was used. The foamed product had the following properties:

Density—1.95 lbs./ft.$^3$
Open cells—3.6%
Humidity aging, volume change—7.4% after 7 days at 158° F. and 95% relative humidity
Heat distortion temperature—104° C.

Example 8

A rigid polyurethane foam product was prepared as described in Example 6 except 2.5 grams (instead of 3 grams) of "R–8020" catalyst was used. The foamed product had the following properties:

Density—1.98 lbs./ft.$^3$
Open cells—3.9%
Humidity aging, volume change—46.4% after 7 days at 158° F. and 95% relative humidity
Heat distortion temperature—103° C.

Example 9

A rigid polyurethane foam product was prepared as described in Example 5 except 1.0 gram (instead of 3 grams) of "R–8020" catalyst and five drops of "T–12" catalyst were used. The foam product had the following properties:

Density—1.92 lbs./ft.$^3$
Open cells—3.3%
Humidity aging, volume change—5.8% after 7 days at 158° F. and 95% relative humidity
Heat distortion temperature—104° C.

Example 10

A rigid polyurethane foam product was prepared as described in Example 6 except 1.0 gram (instead of 3 grams) of "R–8020" catalyst and five drops of "T–12" catalyst were used. The foamed product had the following properties:

Density—2.02 lbs./ft.$^3$
Open cells—4.4%
Humidity aging, volume change—34.7% after 7 days at 158° F. and 95% relative humidity
Heat distortion temperature—90° C.

A comparison of the foam properties of Examples 5, 7 and 9 with the foam properties of Examples 6, 8 and 10 reveal the critical necessity of proper resole structure in order to product a commercially acceptable foam. The Examples 5, 7 and 9 foams were produced using resoles whose molecular structural distribution falls within the limits of this invention. The structural distribution of the Examples 6, 8 and 10 resoles was outside the limits of this invention. The poor humidity aging property of the Examples 6, 8 and 10 foams indicates that they would be unacceptable in many commercial applications where the foams of Examples 5, 7 and 9 would be acceptable.

The amount of volume change caused by humidity is a critical physical property of polyurethane foams because in many commercial applications these foams are exposed to humid conditions. And large volume changes under humid conditions can cause severe and damaging stresses in the foams or the structures in which they are used.

Ideally the volume change of the foam under humid conditions should be zero. Practically however the lower the percentage of volume change the better.

I claim:
1. A polyurethane prepared by a process which comprises reacting an organic polyisocyanate with a polyol;
said polyol being a resole-based polyol prepared by a process which comprises reacting an alkylene oxide with a resole;
said resole being formed by reacting, under basic conditions, phenol and formaldehyde in a mole ratio of formaldehyde to phenol of 2.4 to 2.8 moles of formaldehyde per mole of phenol; and
said resole comprising, by weight, 40 to 70% trimethylol phenol and dimeric resole; 15 to 30% dimethylol phenol and trimeric polymers; 5 to 10% monomethylol phenol and tetrameric and larger resole polymers; and 1% or less free phenol.
2. The polyurethane of claim 1 wherein said alkylene oxide is selected from the group consisting of propylene oxide, ethylene oxide and butylene oxide.
3. The polyurethane plastic of claim 1 wherein a blowing agent is included with the reaction mixture of polyisocyanate and polyol to prepare a cellular polyurethane plastic.

4. A rigid, low density polyurethane foam product comprising the reaction product of a polyisocyanate and a polyol in the presence of a catalyst, blowing agent and surfactant wherein said polyol is an oxyalkylated resole; said resole comprising, by weight, 40 to 70% trimethylol phenol and dimeric resole; 15 to 30% dimethylol phenol and trimeric resole polymers; 5 to 10% monomethylol phenol and tetrameric and larger resole polymers; and 1% or less free phenol.

References Cited

UNITED STATES PATENTS

| | | | |
|---|---|---|---|
| 2,608,536 | 8/1952 | Sterling | 260—2.5 A |
| 3,682,845 | 8/1972 | Longley | 260—2.5 AP |

OTHER REFERENCES

| | | | |
|---|---|---|---|
| 1,229,289 | 11/1966 | Germany | 260—2.5 AP |

DONALD E. CZAJA, Primary Examiner

C. W. IVY, Assistant Examiner

U.S. Cl. X.R.

260—59, 77.5 AP, 613 B